Nov. 27, 1956

R. G. ANDREW 2,772,380

TUBULAR ELECTRONIC UNIT

Filed April 26, 1954

INVENTOR.
RICHARD G. ANDREW
BY C. G. Stratton
ATTORNEY

United States Patent Office 2,772,380 Patented Nov. 27, 1956

2,772,380

TUBULAR ELECTRONIC UNIT

Richard G. Andrew, Van Nuys, Calif.

Application April 26, 1954, Serial No. 425,424

5 Claims. (Cl. 317—101)

This invention relates to an electronic unit adapted to receive the pins or prongs of an electronic tube and creating for said tube and the electronic assembly in which incorporated a pre-assembled and often basic unit that is relatively inexpensive, can be produced by automatic or semi-automatic methods and is space-saving over conventional electronic assemblies of like electrical characteristics.

In my pending application entitled Modular Electronic Unit, Serial No. 411,885, filed February 23, 1954, now abandoned, I have disclosed a unit that comprises a plurality of similarly shaped ceramic wafers or discs that constitute modules which are assembled in stacked relation to occupy a minimum of space. Each module embodies one or two electronic parts, such as condensers, resistors, capacitors, etc. The stacking of the modules and their connection in an electric circuit is obtained by the use of a set of metallic connector elements that are adapted to receive the pins of an electronic tube to mount such tube on the modular unit and themselves embody pins adapting said unit to be mounted on a base or socket.

Whereas the structure in my pending application utilized the opposite faces of a plurality of ceramic discs to carry conductive imprints of the small electronic elements mentioned, or the parts themselves, the present invention contemplates carrying said imprints or parts on the outer and inner surfaces of a ceramic tubular member which, while quite small in actual size, is, nevertheless, relatively large in surface area. As an example, a tube having a five-eighths inch outside diameter and a half-inch inside diameter, one inch long, will have a total surface area approximating three and three-quarters inches.

Accordingly, it is an object of this invention to provide a tubular unit of dielectric material and embodying on the faces thereof the components and their connections of an electronic circuit or a basic component part of a large electronic circuit.

Another object of the invention is to provide such a unit with tube pin-receiving means, at one end, and base or socket-entering pins at the opposite end.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes preferred embodiments of the present invention, which are given by way of illustration or example only.

In the drawing, like reference characters designate similar parts in the several views.

Figure 1:
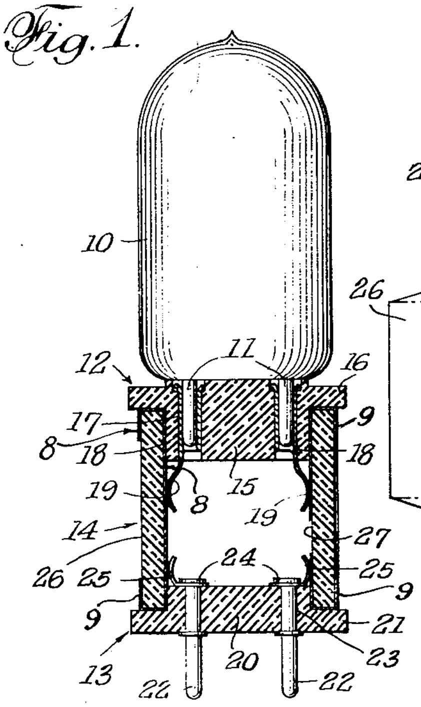
Fig. 1 is a longitudinal sectional view of an electronic unit according to the present invention and show in operative association with an electronic tube.

Fig. 1 shows a generally conventional electronic tube 10 having a plurality of projecting prongs or pins 11 which, within the tube envelope, are connected to the different plate, grid, heater, etc. elements of said tube. In this instance, two of the four pins 11 are shown in Fig. 1, and it will be obvious that the number of said pins may vary according to the connections needed for tube 10.

The present electronic unit comprises, generally, a cap or socket member 12 adapted to be engaged by said pins 11, a base or pin member 13 adapted to engage a base or tube socket, and a tubular member 14 interconnecting the members 12 and 13, the member 14 embodying on all or same of its surfaces, conductive portions that, according to arrangement and form, constitute small electronic parts, such as condensers, resistors, capacitors, etc.

The cap member 12 is preferably made of ceramic or other suitably dielectric material and comprises a circular element having a body 15 and an annular flange 16. Said body is provided with a plurality of transverse through bores 17 in number and arrangement similar to the number and arrangement of the pins 11 of tube 10. In each bore 17 there is fitted a tubular metallic socket 18 of an internal size to frictionally receive one of the pins 11. The inner end of each said socket 18 is provided with a flexible extension constituting a contact brush 19, said brushes being spring-biased outwardly with respect to the center of member 12.

Base member 13 is made of a material similar to the material used for cap member 12 and, in form, is also similar to said cap member, except the body 20 may be substantially thinner than the cap body 15. Said member 13 is provided with an annular flange 21. Said base member is provided with a set of pins 22 preferably similar in number to the tube pins 11 and comparably arranged so as to be adapted to fit a tube base or socket of the type ordinarily adapted to receive pins 11. Said pins 22 extend through holes or bores 23 provided in the body 20 and inner heads 24 provided on said pins may serve to fasten brushes 25 to said respective pins. Said brushes are also biased outward from the center of member 13.

The tubular member 14, of ceramic, such as steatite or like material, is molded or otherwise formed to be rigid. Thus, as seen in both Figs. 1 and 4, the member 14 has an outer surface 26, an inner surface 27, and end surfaces 28*a* and 29*a*. The brushes 19 and 25 are spring urged to bear against inner surface 27.

Figure 4:
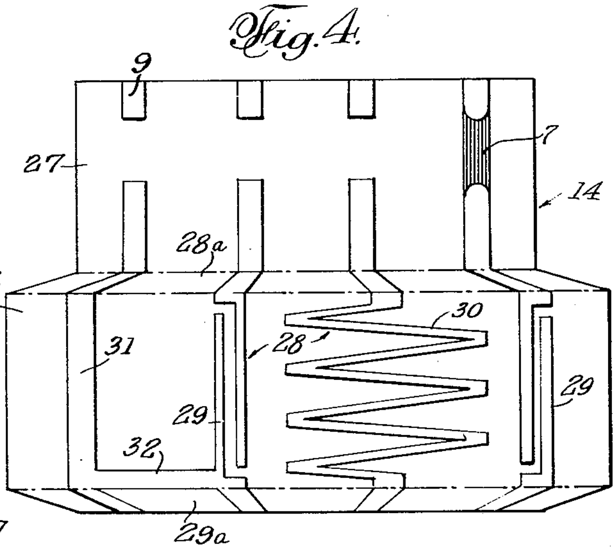
Fig. 4 is a flat or panoramic view showing the inner, outer and end surfaces of a tubular element embodied in the present unit and indicating the manner of providing said surfaces with electronic part imprints.

As best seen in Fig. 4, said surfaces are provided by imprints 28 of various forms, such as one or more condensers 29, a resistance 30, and one or more of various other imprints that comprise conductors 31, cross connection 32, etc. These imprints are applied by what is known as metallizing, a process that entails silver painting or printing onto said surfaces, furnace-curing the imprinted tubular element, and, finally, tinning or coating the silvered surfaces with solder.

In addition to imprinting the elements or components of an electric circuit, some of the different elements such as resistors 33 and capacitors 34, in their physical form, may be attached by tinning or solder to imprinted positions. Thus, the tubular element 14 may bear on one or more of its surfaces a pattern embodying different electrical elements and their interconnecting conductors to establish a desired component electric circuit in which tube 10 is a component and pins 22 the means for placing said component circuit in a larger electric circuit having many such components.

In assembly of members 12, 13 and 14, the different brushes 19 and 25 are arranged to contact imprints 28 in desired arrangement. The assembly is then subjected to oven heat so that the tinning on imprints 28 may fuse to the brushes and integrate the assembly.

The disclosed modular unit may thus be considered as having a thermionic vacuum tube socket 12 with terminals 18, the terminals 18 extending beyond the ends of the two prongs 11 and terminating in spring contacts or brushes 19. The tubular member 14 has first and second sets of printed conductor elements, the first set including U-shaped conductors 8, while the second set includes U-shaped conductors 9. Because of the existence of the gaps between the two sets of contacts, it becomes possible to mount or print electrical components which are in series between prongs 11 and 22 by printing or mounting such components on the inner surface 27 of cylinder 14 or on the outer surface 26 of the same cylinder in a manner illustrated in Figure 4 by such components as condensers 29 and resistor 30. However, since there are two sets of gaps between the printed conductors, i. e., the inner gaps and the outer gaps, it becomes also possible to connect two components in parallel relationship with respect to each other, but in series between the prongs 11 and 22. This is also illustrated in Fig. 4 by means of condenser 29 and resistor 7 which are connected in parallel relationship with respect to each other, but are in series with prongs 11 and 22.

Figure 5:
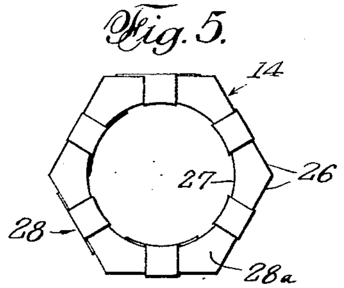
Figs. 5 and 6 are plan or end views of modified forms of tubular elements.
Figure 2:
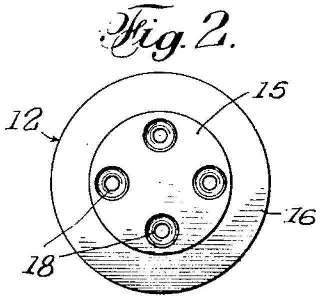
Fig. 2 is a top plan view of said unit.
Figure 6:
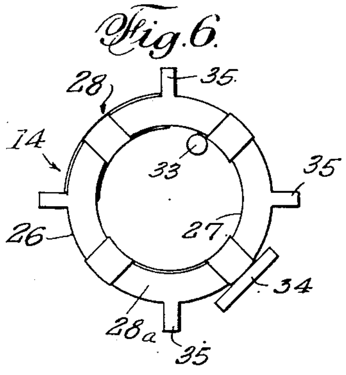
Figure 3:
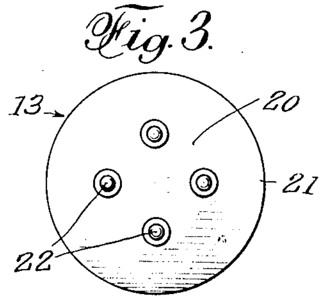
Fig. 3 is a bottom plan view.

As can be seen from Figs. 5 and 6, the outer surface 26, instead of being cylindrical, may be polygonal so that member 14 is a prism (Fig. 5), or may be divided by ribs 35 into separated areas that enable closer proximity of the different imprints because said ribs constitute dielectric separators. Therefore, the areas spaced by said ribs may form recesses in which elements, such as 34, may be housed.

While the foregoing has illustrated and described what are now contemplated to be the best modes of carrying out the invention, the constructions are, of course, subject to modification without departing from the spirit and scope of the invention. It is, therefore, not desired to restrict the invention to the particular forms of construction illustrated and described, but to cover all modifications that may fall within the scope of the appended claim.

Having thus described the invention, what is claimed and desired to be secured by Letters Patent is:

1. An electronic modular unit comprising a thermionic tube socket, having a cylindrical body and a flange constituting an integral part of said body, a plurality of orifices in said body, a corresponding plurality of socket terminals in said body for receiving a corresponding plurality of prongs of said thermionic tube, one end of said terminals projecting beyond said cylindrical body and being bent first outwardly and then inwardly to act as sliding, electrical spring contact elements, a hollow, tubular insulation member having upper and lower edges and inner and outer surfaces joining said edges, first and second sets of printed conductors on said member, the number of said conductors in each set being equal to the number of said socket terminals, both sets of conductors extending over portions of said inner and outer surfaces and the respective edges of said member, the conductors of the first set being spaced from the conductors of the second set in the direction of the longitudinal axis of said unit, an insulation plug partially fitting into said member and engaging the lower edge of said insulation member, said insulation plug having a corresponding plurality of metallic prongs circumferentially spaced in the same manner as the prongs of said thermionic tube, said prongs having metallic spring contact ears making pressure contacts with the inner portions of the respective printed conductors of the second set, said tube socket also partially fitting into said hollow member and engaging with its flange the upper edge of said hollow member, and the spring portions of said socket terminals making pressure contacts with the inner portions of the respective printed conductors of the first set, and fused metallic bonds between said tube socket, hollow member and said plug formed by said sets of printed conductors, for integrating said socket, member and plug into a unitary structure.

2. An electronic modular unit as defined in claim 1 which also includes printed electrical circuit components on the outer surface of said hollow member, said components serially connecting the respective conductors of the first set to the respective conductors of the second set.

3. An electronic modular unit as defined in claim 2 in which said hollow member is a right hollow cylinder having a corresponding plurality of outwardly projecting radial ribs for separating said electrical components.

4. An electronic modular unit as defined in claim 2 in which said hollow member is a hollow, right hexagon.

5. An electronic modular unit as defined in claim 2 which also includes at least one printed circuit element interconnecting a conductor of the first set with a conductor of the second set on the inner surface of said hollow member, said element being in shunt with the electrical circuit component interconnecting the same conductors as said element.

References Cited in the file of this patent

UNITED STATES PATENTS

| | | |
|---|---|---|
| 1,892,696 | Duncan | Jan. 3, 1933 |
| 2,229,485 | Osenberg | Jan. 21, 1941 |
| 2,611,040 | Brunetti | Sept. 16, 1952 |